United States Patent
Hodot et al.

(10) Patent No.: US 12,510,558 B2
(45) Date of Patent: Dec. 30, 2025

(54) PRESSURE MEASUREMENT PROBE COMPRISING A PRESSURE SENSOR BOARD

(71) Applicant: THALES, Meudon (FR)

(72) Inventors: Romain Hodot, Valence (FR); Lilian Cauchard, Valence (FR)

(73) Assignee: THALES, Meudon (FR)

( * ) Notice: Subject to any disclaimer, the term of this patent is extended or adjusted under 35 U.S.C. 154(b) by 279 days.

(21) Appl. No.: 18/290,446

(22) PCT Filed: Jun. 3, 2022

(86) PCT No.: PCT/EP2022/065252
§ 371 (c)(1),
(2) Date: Nov. 13, 2023

(87) PCT Pub. No.: WO2022/258535
PCT Pub. Date: Dec. 15, 2022

(65) Prior Publication Data
US 2024/0288465 A1  Aug. 29, 2024

(30) Foreign Application Priority Data
Jun. 7, 2021 (FR) .................................. 2105854

(51) Int. Cl.
*G01P 5/14* (2006.01)
*B64D 45/00* (2006.01)

(52) U.S. Cl.
CPC ............... *G01P 5/14* (2013.01); *B64D 45/00* (2013.01)

(58) Field of Classification Search
CPC . G01P 5/14; G01P 5/165; G01L 19/06; G01L 19/148; B64D 43/02; B64D 45/00
See application file for complete search history.

(56) References Cited

U.S. PATENT DOCUMENTS

| | | | |
|---|---|---|---|
| 4,096,744 A | 6/1978 | De Leo et al. | |
| 6,672,152 B2 * | 1/2004 | Rouse | G01P 13/025 73/170.01 |
| 7,334,467 B1 | 2/2008 | Dupuis | |
| 7,597,018 B2 * | 10/2009 | Braun | G01P 5/165 73/178 R |
| 9,909,905 B2 * | 3/2018 | Wong | G01P 13/025 |
| 10,495,662 B2 * | 12/2019 | Genevrier | G01S 17/58 |

(Continued)

FOREIGN PATENT DOCUMENTS

| | | | | |
|---|---|---|---|---|
| CN | 110987287 A | * | 4/2020 | ............. G01L 15/00 |
| EP | 2 439 541 A1 | | 4/2012 | |
| FR | 3 067 469 A1 | | 12/2018 | |

*Primary Examiner* — Natalie Huls
(74) *Attorney, Agent, or Firm* — BakerHostetler

(57) ABSTRACT

A pressure measurement probe for an aircraft, includes a pressure sensor board comprising an electronic board equipped with a pressure sensor provided with an air inlet, the electronic board further comprising at least four fixing points distributed on a circle at regular angular intervals and configured to allow the sensor board to be fixed in the pressure measurement probe in such a way as to have, when the aircraft is on the ground, a pressure sensor air inlet that is directed downward and an angular offset less than or equal to 45° between the axis of the air inlet of the pressure sensor and the vertical, irrespective of the position of the probe on the aircraft.

6 Claims, 2 Drawing Sheets

(56) References Cited

U.S. PATENT DOCUMENTS

| | | | |
|---|---|---|---|
| 11,181,545 B2* | 11/2021 | Reid | G01P 13/025 |
| 11,781,574 B2* | 10/2023 | Mauro | F16B 5/0088 |
| | | | 29/428 |
| 2011/0141471 A1 | 6/2011 | Schlotterbeck et al. | |
| 2012/0118075 A1* | 5/2012 | Golly | G01P 5/165 |
| | | | 73/861.42 |
| 2019/0383847 A1 | 12/2019 | Naslund et al. | |
| 2024/0247993 A1* | 7/2024 | Hodot | G01L 19/147 |
| 2025/0067767 A1* | 2/2025 | Lang | G01P 5/16 |

* cited by examiner

PRESSURE MEASUREMENT PROBE COMPRISING A PRESSURE SENSOR BOARD

CROSS-REFERENCE TO RELATED APPLICATIONS

This application is a National Stage of International patent application PCT/EP2022/065252, filed on Jun. 3, 2022, which claims priority to foreign French patent application No. FR 2105854, filed on Jun. 7, 2021, the disclosures of which are incorporated by reference in their entireties.

FIELD OF THE INVENTION

The invention relates to avionic probes.

BACKGROUND

Control of the flight of any aircraft requires knowledge of its airspeed, which is its speed with respect to the air, namely with respect to the relative wind. This airspeed is determined using probes that measure the static pressure Ps and the total pressure Pt. The total pressure Pt and static pressure Ps provide the modulus of this airspeed velocity vector.

The static pressure, in a moving fluid (water, air, . . . ), is the pressure measured by a sensor traveling at the same speed as the fluid. In other words, the static pressure is the pressure of the fluid when stationary, i.e. the ambient pressure at the location in which the airplane is situated.

The dynamic pressure Pd represents the kinetic energy per unit volume within a moving fluid. It is therefore dependent only on the speed and the density of the fluid.

The total pressure Pt in a fluid (water, air, etc.) is the sum of the static pressure and of the dynamic pressure.

The measurements of total pressure, static pressure or angle of attack make it possible to calculate the airspeed with respect to the surrounding air, the altitude, the angle of attack or the side-slip of an aircraft.

Static-pressure probes for measuring the static pressure Ps are known.

The practice of mounting what are commonly referred to as "parietal networks" or "static networks" or parietal probes as a replacement for all these measurements, is also known. The pressure thus measured at several points on the fuselage of an aircraft is used to determine the value of all of the aforementioned anemometric parameters.

A network of parietal probes ultimately consists in creating a multitude of holes for measuring the pressure on the skin of the aircraft which pressure in the present application is referred to as the parietal pressure Pp.

In the case of military aircraft, the desire for stealth has led to the use of only non-protruding probes, such as on the B-2 stealth bomber which has only static-pressure probes. This installation uses the principle of parietal probes to determine the flight parameters from the field of pressures measured around the aircraft.

Whatever the location of the probes, these probes are subject to atmospheric attack, whether this be in flight or on the ground. The latter scenario is very tricky because, unlike in the flight phase, it is impossible, on the ground, to monitor the condition of the probes when the air data system is switched off.

One of the most feared dangers is that of the holes for probes intended to measure pressure becoming blocked. Specifically, these holes may become blocked on the ground, while the aircraft are parked, as a result of water, ice, dust, sand, or insects (such as mason wasps). These holes may also become blocked during flight, as a result of water and icing.

One traditional method for guarding against this is to cover the probes with covers when the airplane is on the ground. While this can prove to be effective on traditional forms of airplane, for which the probes are mounted with the air inlet axes directed horizontally (mounting plate vertical) or downward, it does not guarantee effective protection on airplanes of the flying wing type in which some of the probes are positioned with the air inlet axes directed upward.

At the present time, equipment comprising a pressure sensor has an orientation recommended by the manufacturer and that has to be conformed to in order to protect that sensor. That means that there need to be at least four models of sensor board in order to obtain, regardless of the position of the probe on the aircraft, an angular offset less than or equal to 45° between the axis of the air inlet of the pressure sensor and the vertical, and this leads to high design, production and maintenance costs.

SUMMARY OF THE INVENTION

An aim of the invention is to overcome the problems cited above, and notably to protect the sensor from the water that might damage it.

One aspect of the invention proposes a pressure measurement probe for an aircraft, comprising a pressure sensor board comprising an electronic board equipped with a pressure sensor provided with an air inlet, the electronic board further comprising at least four fixing points distributed on a circle at regular angular intervals and configured to allow the sensor board to be fixed in the pressure measurement probe in such a way as to have, when the aircraft is on the ground, a pressure sensor air inlet that is directed downward and an angular offset less than or equal to 45° between the axis of the air inlet of the pressure sensor and the vertical, irrespective of the position of the probe on the aircraft.

With an angular offset less than or equal to 45° between the axis of the pressure sensor air inlet and the vertical, when the aircraft is parked, water is removed under the effect of gravity and does not obstruct the sensor inlet thus, by means of a single model of sensor board, providing a solution to the problem of the build-up of water in the sensor.

In one embodiment, the electronic board has the shape of an at least four-sided regular polygon, or even a circle, which is considered to be a regular polygon having an infinite number of sides.

According to one embodiment, the electronic board has the shape of a regular hexagon.

This embodiment is optimization between the difficulty (and therefore cost) of manufacturing the sensor board and the removal of water from the sensor.

In one embodiment, two electrical connectors arranged near two sides of the polygon that are separated from one another by one side.

Thus, one two connectors is always easy to access.

According to one embodiment, the measurement probe is a static or parietal probe.

In one embodiment, the fixing points for the sensor board comprise holes arranged near the vertices of the polygon.

This then limits the area of implantation on the sensor board.

BRIEF DESCRIPTION OF THE DRAWINGS

The invention will be better understood on studying a few embodiments described by way of entirely non-limiting examples and illustrated by the attached drawings in which.

In all of the figures, elements having identical references are similar.

DETAILED DESCRIPTION

Figure 1:
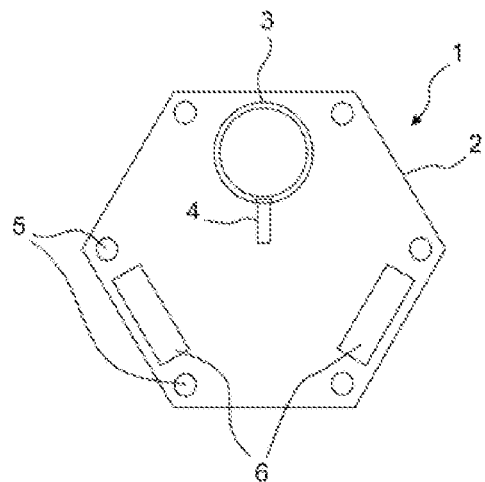
FIG. 1 schematically illustrates a pressure sensor board of a pressure measurement probe, according to one aspect of the invention.

FIG. 1 schematically depicts a pressure sensor board 1 of a pressure measurement probe comprising an electronic board 2 of at least four-sided, in this instance nonlimitingly six-sided, polygonal shape, equipped with a pressure sensor 3 provided with an air inlet 4, the electronic board 2 further comprising fixing means 5 configured to fix the sensor board 1 in the pressure measurement probe.

The supporting structure is the central mechanical component of a pressure measurement probe and serves notably to fix the various electronic boards: sensor board, processing board or power supply board.

The sensor board 1 which may be fixed to the supporting structure in a number of different positions corresponding to the number of sides or vertices of the polygon, this solution is the outcome of a constraint dictated by the sensor 3.

Specifically, the sensor 3 needs always to be positioned in such a way that the air inlet is directed downward in order to remove condensation. By combining the appropriate orientation of the probe on the airplane with the orientation of the electronic board 2, the sensor is always positioned with its air inlet 4 downward when the airplane is in horizontal trim, thus allowing for the removal of condensation on the ground.

By way of optimization, the electronic board 2 has the shape of a regular hexagon, this being an optimization between the difficulty, and therefore cost, of manufacturing the sensor board 1 and the removal of water from the sensor 3.

Figure 2:
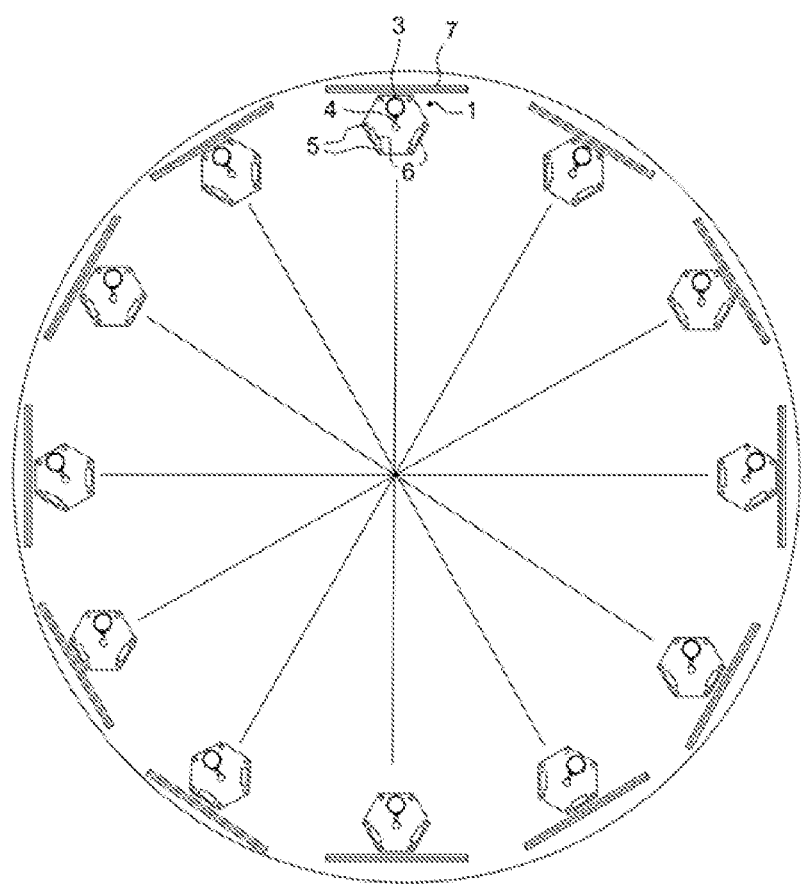
FIG. 2 schematically illustrates the positioning of a sensor board of FIG. 1 with respect to an inclination of the body of an aircraft, according to one aspect of the invention.

FIG. 2 schematically depicts the position of such a sensor board 1 of FIG. 1 with respect to an inclination of the aircraft body when the airplane is in horizontal trim.

The hexagonal shape of the pressure sensor board 1, i.e. the shape of the electronic board 2, means that simply by modifying its position inside the probe, the one same probe can have as many orientations as are necessary in order to be able to position a probe in all the possible orientations so that this probe always has the correct orientation for removing any water that trickles toward the sensor, or condensate, something which was not possible in equipment of the prior art. This orientable sensor board 1 provides the equipment with a great deal of flexibility of installation.

Figure 3:
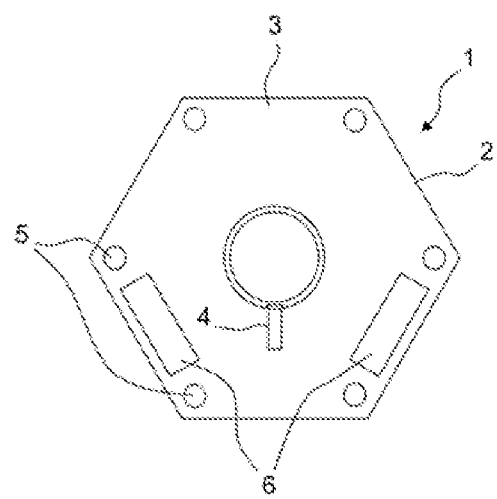
FIG. 3 schematically illustrates one embodiment of a sensor board of FIG. 1, according to one aspect of the invention.

FIG. 3 schematically depicts one embodiment of a sensor board of FIG. 1 in the case of an electronic board 2 in the shape of a regular hexagon.

The invention claimed is:

1. A pressure measurement probe for an aircraft, comprising a pressure sensor board comprising an electronic board equipped with a pressure sensor provided with an air inlet, the electronic board further comprising at least four fixing points distributed on a circle at regular angular intervals and configured to allow the sensor board to be fixed in the pressure measurement probe in such a way as to have, when the aircraft is on the ground, a pressure sensor air inlet that is directed downward and an angular offset less than or equal to 45° between the axis of the air inlet of the pressure sensor and the vertical, irrespective of the position of the probe on the aircraft.

2. The pressure measurement probe as claimed in claim 1, wherein the electronic board has the shape of an at least four-sided regular polygon.

3. The pressure measurement probe as claimed in claim 2, wherein the electronic board has the shape of a regular hexagon.

4. The measurement probe as claimed in claim 2, comprising two electrical connectors arranged near two sides of the polygon that are separated from one another by one side.

5. The pressure measurement probe as claimed in claim 1, being a static or parietal probe.

6. The pressure measurement probe as claimed in claim 1, wherein the fixing points for the sensor board comprise holes arranged near the vertices of the polygon.

* * * * *